US009584045B2

(12) United States Patent
Rozand et al.

(10) Patent No.: US 9,584,045 B2
(45) Date of Patent: Feb. 28, 2017

(54) CONVERTER CONTROLLER WITH HALF BRIDGE ADAPTIVE DEAD TIME CIRCUIT AND METHOD

(75) Inventors: Daniel Rozand, Romans sur Isere (FR); Patrick Chambon, Saint Martin d'Heres (FR); Stefano De Cesaris, Grenoble (FR)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days.

(21) Appl. No.: 14/368,351

(22) PCT Filed: Jan. 5, 2012

(86) PCT No.: PCT/IB2012/000164
§ 371 (c)(1),
(2), (4) Date: Aug. 8, 2014

(87) PCT Pub. No.: WO2013/102781
PCT Pub. Date: Jul. 11, 2013

(65) Prior Publication Data
US 2015/0036404 A1 Feb. 5, 2015

(51) Int. Cl.
*H02M 7/5387* (2007.01)
*H02M 1/38* (2007.01)

(52) U.S. Cl.
CPC .......... *H02M 7/5387* (2013.01); *H02M 1/38* (2013.01); *H02M 2001/385* (2013.01)

(58) Field of Classification Search
CPC ............... H02M 7/538; H02M 7/5387; H02M 7/53871; H02M 1/38; H02M 2001/385
(Continued)

(56) References Cited

U.S. PATENT DOCUMENTS

2004/0027760 A1* 2/2004 Villaret .......................... 361/94
2005/0110475 A1* 5/2005 Chapuis .................. H02M 1/38
323/282

(Continued)

FOREIGN PATENT DOCUMENTS

DE 10139642 A1 4/2003
EP 0606601 A2 7/1994

OTHER PUBLICATIONS

Dodge, et al. "IGBT tutorial: Part 1—Selection" EE Times. Mar. 8, 2007. http://www.eetimes.com/document.asp?doc_id=1273173.
"Inverter Interface and Digital Deadtime Generator for 3-Phase PWM Controls." IXYS, 1998.
"Pulse-width modulation." Wikipedia, accessed Jul. 29, 2011. https://en.wikipedia.org/wiki/Pulse-width_modulation.
"Insulated-gate bipolar transistor." Wikipedia, accessed Jul. 29, 2011. https://en.wikipedia.org/wiki/Insulated-gate_bipolar_transistor.
(Continued)

*Primary Examiner* — Emily P Pham
*Assistant Examiner* — Alex Torres-Rivera
(74) *Attorney, Agent, or Firm* — Lando & Anastasi, LLP

(57) ABSTRACT

The present disclosure relates to a controller, a circuit and method for controlling a power converter using pulse width modulation (PWM). At least one logic block (13, 15, 16) of the controller is configured to remove a command (4) which is configured to control the other power semiconductor switch (2) in a half-bridge (1,2) so that the other power semiconductor switch (2) remains in a non-conductive state while an antiparallel diode (6) allows an electric current (5) to pass in one direction, called the diode's forward direction, while blocking current in the opposite direction. In case the diode (6) is conducting instead of the other power semiconductor switch during the duration of the state of the command, the switching command (4) for the latter is omitted. The controller is further configured to modify the dead time interval (Tdead) between switching from the power semiconductor switch (3) to another power semiconductor switch (4) or vice versa in order to avoid a discontinuity in the transfer function (25).

19 Claims, 9 Drawing Sheets

(58) Field of Classification Search
USPC ......... 363/16, 17, 56.01, 56.02, 97, 98, 131, 363/132; 323/282; 327/401
See application file for complete search history.

(56) References Cited

U.S. PATENT DOCUMENTS

| | | |
|---|---|---|
| 2009/0096502 A1 | 4/2009 | Miyamoto et al. |
| 2009/0278621 A1* | 11/2009 | Kris ........................ H02M 1/38 332/109 |
| 2010/0149843 A1* | 6/2010 | Walde ................... H02M 7/539 363/74 |
| 2012/0218800 A1* | 8/2012 | Jimichi ............. H02M 7/53803 363/131 |

OTHER PUBLICATIONS

"Field programmable gate array." Wikipedia, accessed Aug. 4, 2011. https://en.wikipedia.org/wiki/Field-programmable_gate_array.
"Duty cycle." Wikipedia, accessed Jul. 29, 2011. https://en.wikipedia.org/wiki/Duty_cycle.
Leggate, David, and Russel J. Kerkman. "Pulse based dead time compensator for PWM voltage inverters." Industrial Electronics, Control, and Instrumentation, IEEE Transactions on Industrial Electronics, vol. 44, No. 2, Apr. 1997.
International Search Report dated Nov. 15, 2012 for PCT/IB2012/000164.

\* cited by examiner

CONVERTER CONTROLLER WITH HALF BRIDGE ADAPTIVE DEAD TIME CIRCUIT AND METHOD

TECHNICAL FIELD

The present disclosure relates to a controller for a power converter. More particularly, the present disclosure relates to a controller, a circuit and method for controlling the power converter using pulse width modulation (PWM).

BACKGROUND

The state of the art in power converters provides an adjustable voltage and frequency to the output through a pulse width modulated (PWM, pulse width modulation) voltage source inverter drive. Power converters can be used in uninterruptible power supplies (UPS), electric motors, etc. The PWM command is used in the power converter for controlling power to electrical devices, made practical by modern electronic power switches. The duty cycle of a switch (ratio of on-time to total cycle time) is varied to achieve a desired average output voltage, current etc., when averaged over time.

A typical power converter is a switching power converter. It has two or more power semiconductor devices such as power semiconductor switches. The power semiconductor switches can, for example, be implemented by insulated-gate bipolar transistors (IGBT). A simple logical error—turning a transistor on at the wrong instant—can cause catastrophic failure in the right or wrong circumstances. When the state of the transistor must change due to requested PWM, the conducting transistor is turned off. Then, after a delay (called dead time), the other transistor is turned on. The delay is added to ensure that there is no possibility of both transistors conducting at the same time. Dead time is necessary to prevent short circuit of the power supply of the switching power converter.

Although the dead time is short, it causes deviation from the desired output. The deviations result in reduced output voltage, distorted machine currents, and torque pulsations. Dead time in the switching output stage also causes nonlinearity in the power circuit transfer function that may be difficult to remove.

Due to the dead time, it is also never possible to reach maximum modulation depth. The maximum actual duty cycle of PWM is limited by the dead time between the power converter commands. Dead time limits the time that the power converter can spend in an active state as a fraction of the total time under consideration. System requirements of the power converter for the minimum allowed command pulse also limits the duty cycle. Due to these constraints, the capacity of the power converter is not fully used. For example, an inverter having a 15 kHz switching frequency, 2 µS dead time, and 2 µS minimum pulse can reach a maximal modulation depth of only 94%. 6% of the theoretical modulation range is lost, which translates into a 6% loss of efficiency. This causes loss in maximum reachable output voltage mostly and additionally negative effect on output voltage waveform in closed loop system, for example due to an earlier saturation of the PWM command.

A known solution to improve the loss and performance has been to increase the DC bus voltage to compensate loss of modulation depth. This, however, increases the cost of the power converter system. The present invention is directed to overcoming one or more of the problems as set forth above.

SUMMARY OF THE INVENTION

In one aspect, the present disclosure is directed to a controller for a power converter using pulse width modulation. The controller comprises at least one control module configured to cause the controller to generate a command for switching a power semiconductor switch between a conductive and non-conductive state. The controller is configured to generate a delay interval between switching from the power semiconductor switch to another power semiconductor switch. The controller is further configured to remove the command configured to control the power semiconductor switch so that the power semiconductor switch remains in a non-conductive state. Now a diode allows an electric current to pass the power semiconductor switch in one direction, while blocking current in the opposite direction. The controller is further configured to modify the delay interval between switching from the power semiconductor switch to said another power semiconductor switch.

In another aspect, the present disclosure is directed to a circuit, comprising the controller, wherein the at least one circuit block comprises the at least one logic module.

In another aspect, the present disclosure is directed to a method for controlling a power converter using pulse width modulation. The method comprises generating a command for switching a power semiconductor switch between a conductive and non-conductive state. The method comprises generating a delay interval between switching from the power semiconductor switch to another power semiconductor switch. The method further comprises removing the command configured to control the power semiconductor switch so that the power semiconductor switch remains in an open state. The method still allows an electric current to pass in one direction, while blocking current in the opposite direction. The method also comprises modifying the delay interval between switching from the power semiconductor switch to said another power semiconductor switch.

At least one of the above aspects provides one or more solutions to the problems and disadvantages with the background art. Other technical advantages of the present disclosure will be readily apparent to one skilled in the art from the following description and claims. Various embodiments of the present application obtain only a subset of the advantages set forth. No one advantage is critical to the embodiments. Any claimed embodiment may be technically combined with any other claimed embodiment(s).

BRIEF DESCRIPTION OF THE DRAWINGS

The accompanying drawings illustrate exemplary embodiments of the disclosure, and together with the general description given above and the detailed description of the embodiments given below, serve to explain, by way of example, the principles of the disclosure.

DETAILED DESCRIPTION

An exemplary embodiment of the present disclosure provides a controller, a circuit and a method for controlling a power converter, the power converter using pulse width modulation (PWM). The controller comprises one or more logic block configured to cause the controller to generate a command for switching a power semiconductor switch between a conductive and non-conductive state. The controller is configured to generate a delay interval between switching from the power semiconductor switch to another power semiconductor switch. The controller is further configured to remove a command which is configured to control a power semiconductor switch so that the power semiconductor switch remains in a non-conductive state. However a diode allows an electric current to pass the power semiconductor switch in one direction, called the diode's forward direction, while blocking current in the opposite direction. The controller is further configured to modify the interval between switching from the power semiconductor switch to another power semiconductor switch. The controller removes the power semiconductor command which is not applicable because the diode is used instead of the power semiconductor switch to conduct current during the duration of the state of the command. The interval between switching from the power semiconductor switch to another power semiconductor switch is also modified. The interval can be removed or reduced. As a result, duty cycle and effectiveness of the power converter can be improved due to better control because unnecessary dead time delays, which decrease the duty cycle, can be mitigated.

Figure 1:
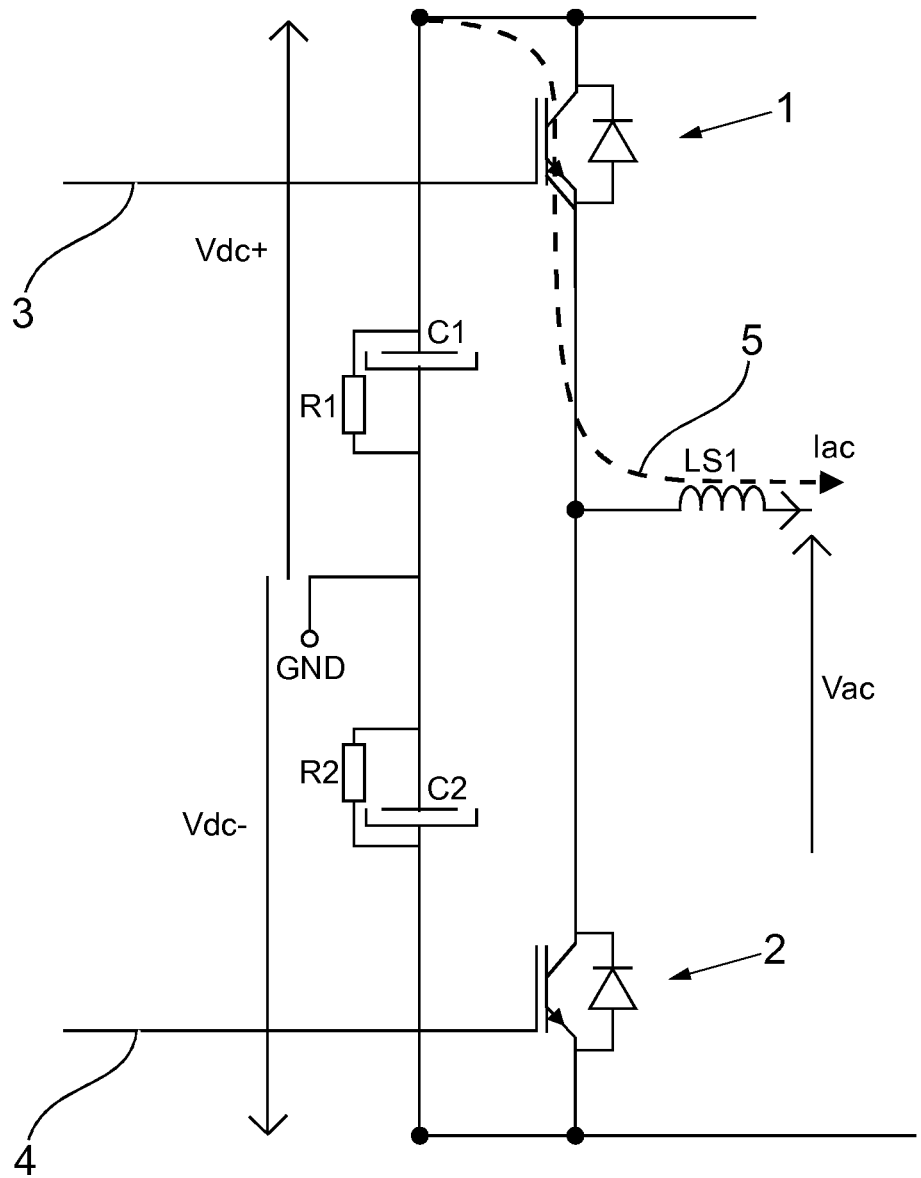
FIG. 1 shows a circuit diagram of a power converter, wherein a top command is driven according to an exemplary embodiment of the present disclosure.

FIG. 1 shows a circuit diagram of a power converter, wherein top command is driven according to an exemplary embodiment of the present disclosure. FIG. 1 illustrates an operation of power converter driven with a PWM modulation. FIG. 1 assumes that the current stays positive during all of the switching period. The power converter comprises two power semiconductor switches 1,2. The power semiconductor switches 1,2 may be, for example, power MOSFETs or insulated gate bipolar transistors (IGBTs). A first power semiconductor switch 1 operates by top command 3 (and may be alternatively referred to as top power semiconductor switch). A second power semiconductor switch 2 operates by bottom command (and may be alternatively referred to as bottom power semiconductor switch). A top command 3 is in active state, i.e. on, commanding the power semiconductor switch 1. The power semiconductor switch 1 is accordingly closed and on (in an active state) and conducting the current. A current flow 5 is shown by the dashed line in the FIG. 1. The bottom command 4 is off and in non-active state. Accordingly the power semiconductor switch 2 is open and off (in a non-active state) and not conducting current.

Figure 2:
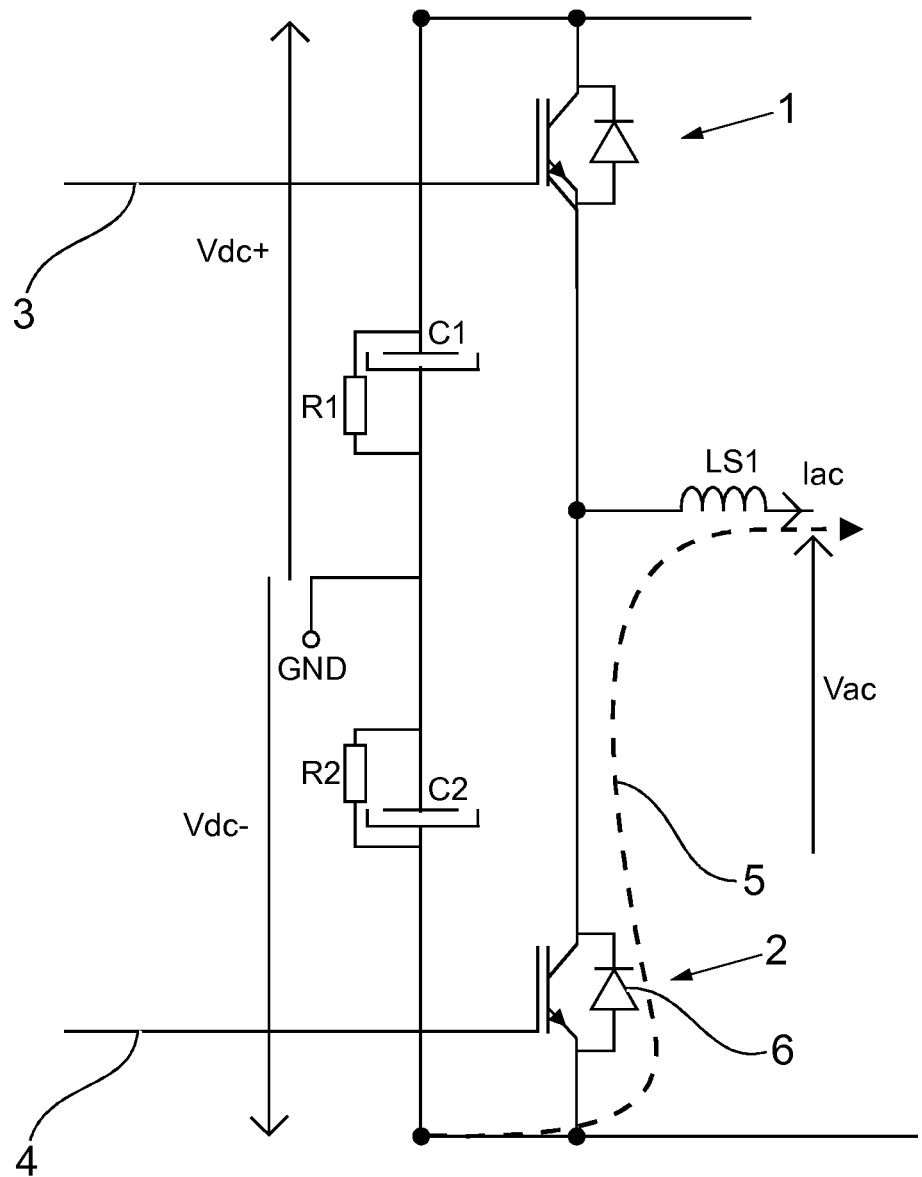
FIG. 2 shows a circuit diagram of the power converter, during dead time according to an exemplary embodiment of the present disclosure.

FIG. 2 shows a circuit diagram of a power converter, wherein dead time is active according to an exemplary embodiment of the present disclosure. The time delay taking place between switching the power semiconductor switches 1,2 is called the dead time. The dead time is required between each state transition: From top to bottom, and from bottom to top. The dead time prevents any cross conduction of the power converter, such as a DC short circuit of the DC voltage, caused by the two power semiconductor switches 1,2 being closed at the same time. The cross conduction may lead to a destruction of the IGBT bridge. In FIG. 2, top command 3 is off so that the power semiconductor switch 1 is open. The bottom command 4 is off and the power semiconductor switch 2 is therefore not driven. There is therefore no specific command for the dead time. However, the current can flow only through a diode 6 as shown by the current flow 5. The diode 6 can be a free wheeling diode or a flyback diode. In the controller the diode 6 allows an electric current to pass the power semiconductor switch 2 in one direction, which may be also called the diode's forward direction, while blocking current in the opposite direction. The current can flow through the diode 6 which is parallel coupled with respect to the power semiconductor switch 2. The current flows when the current stays positive during the switching period.

Figure 3:
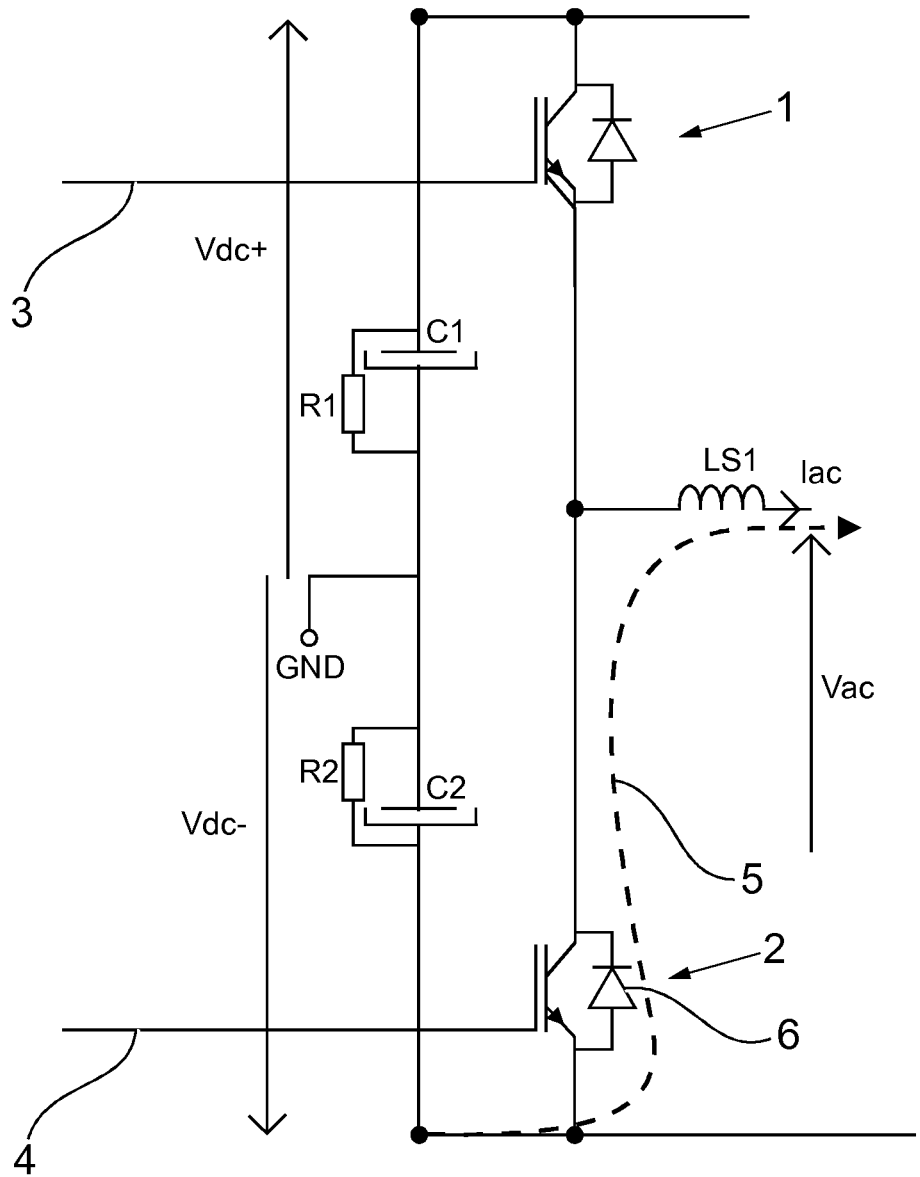
FIG. 3 shows the circuit diagram of a power converter controller, wherein a bottom command is driven according to an exemplary embodiment of the present disclosure.

FIG. 3 shows a circuit diagram of a power converter controller, wherein the bottom command 4 is driven according to an exemplary embodiment of the present disclosure. Bottom command 4 is in active state, i.e. on. The power semiconductor switch 2, for example the bottom IGBT, is driven. The switch 2 cannot close. The current continues to flow through the diode 6 and the current path 5 is the same as in the example of FIG. 2. This fact can be utilized when removing the command for the power semiconductor switch that does not conduct current. In the example of FIG. 3, top command 3 is off so that the power semiconductor device 1, for example top IGBT, is open and non-active.

Figure 4:
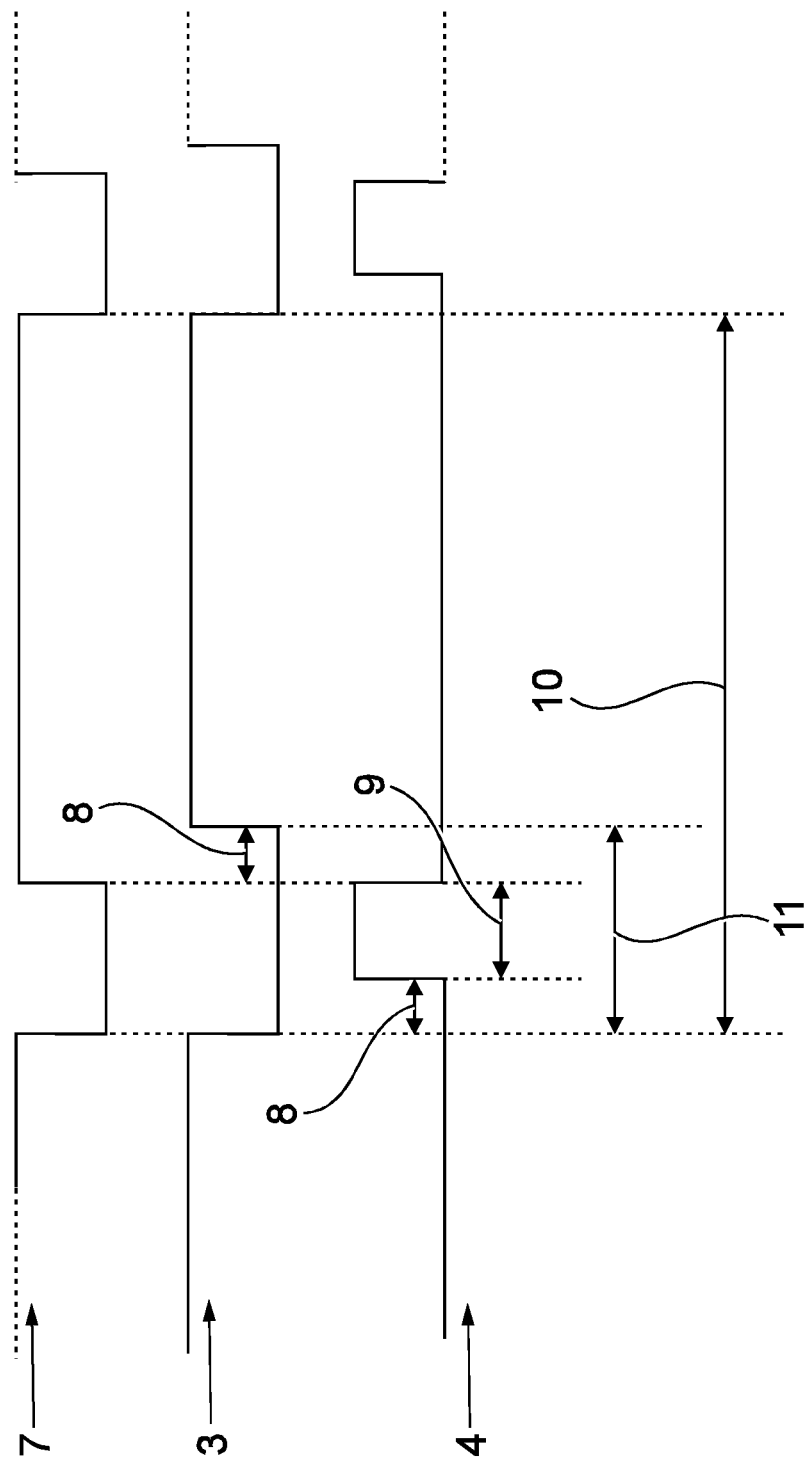
FIG. 4 is a waveform diagram illustrating operation of a controller for a power converter, wherein the dead time is applied, according to an exemplary embodiment of the present disclosure.

Referring to FIG. 4 shows a waveform diagram illustrating operation of a controller for a power converter, wherein the dead time is applied. FIG. 4 shows a desired PWM waveform 7. The desired PWM 7 illustrates PWM out that is desired to be output from the power controller. The controller receives the PWM request 7 so as to control the power converter to create requested PWM power output. State diagram of the top command 3 and bottom command 4 are also shown. Dead time 8 (alternatively referred to as duration of dead time or delay between switching from first to second power semiconductor switch and vice versa) is shown and can be also referred to as $t_{deadtime}$. Minimal pulse 9 illustrates minimum allowed pulse $t_{minpulse}$. It is the minimum duration of the power semiconductor switch command and represents a standard security measure to safe guard against the power semiconductor switch having a system fail due to too short a pulse. A switching period 10 or $T_{switching}$ is the period of the switching cycle. $T_{offMin}$ 11 is the actual duration when the power converter is in an off or non-active state.

According to the FIGS. 1, 2 and 3 showing the current flow 5 in three possible state of the power converter (top command, bottom command, and dead time), the off time duration corresponds to the following function:

$$t_{offmin}=t_{minpulse}+2\times t_{deadtime}$$

The maximum actual duty cycle (ratio of duration of active state to the total period) is then $$\alpha = \frac{T_{switching} - t_{offMin}}{T_{switching}}.$$

For example with $T_{switching}$=66.6 µS, $T_{deadtime}$=2 µS and $T_{minpulse}$=2 µS, α=91%. The output voltage may therefore reach only 91% of input DC voltage.

Figure 5:
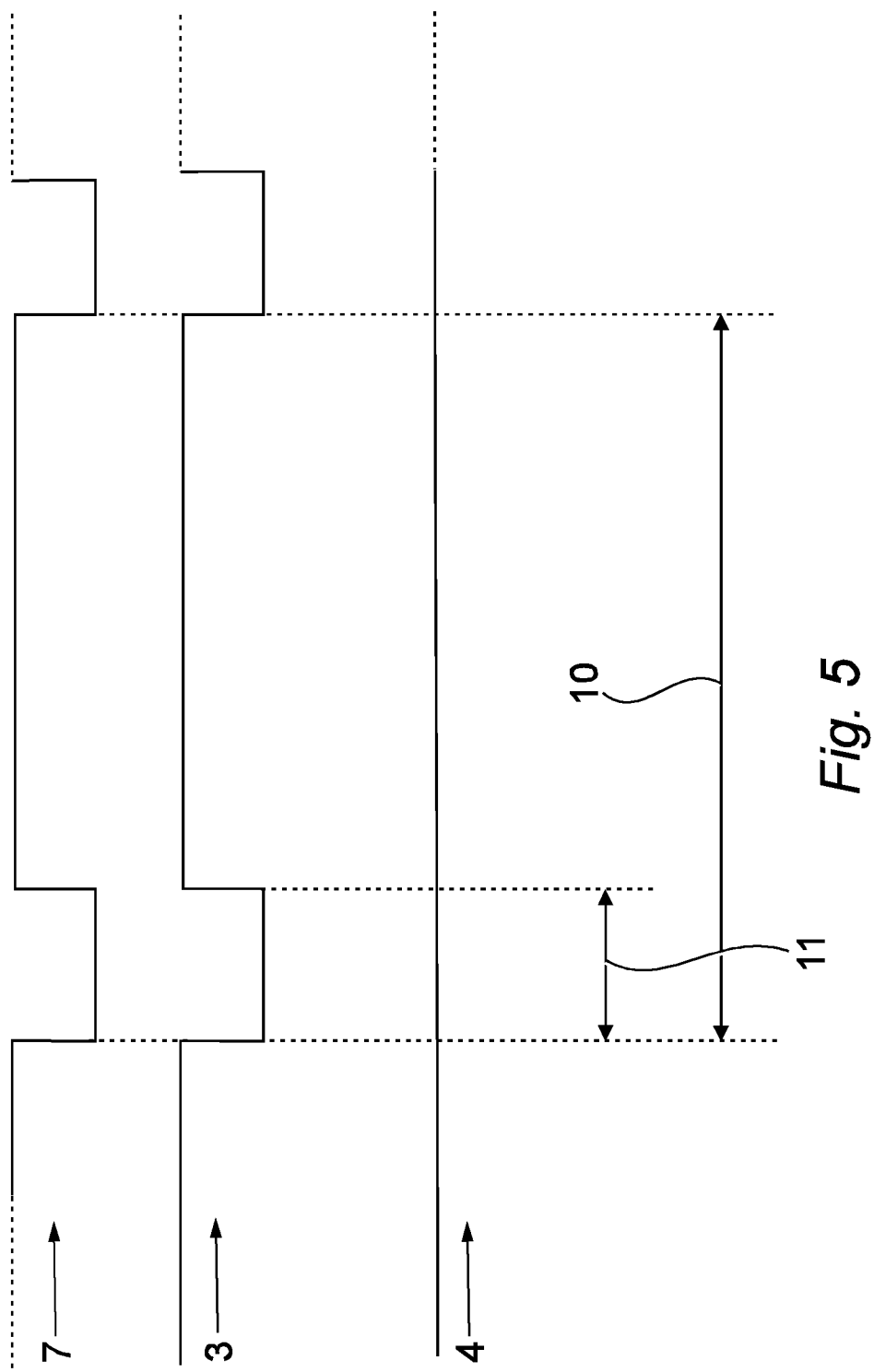
FIG. 5 shows a state diagram of a controller for a power converter, wherein the controller removes a command of a power semiconductor device according to an exemplary embodiment of the present disclosure.

FIG. 5 shows a state diagram of a controller for a power converter, wherein the controller removes a bottom command 4 of a power semiconductor switch 2 according to an exemplary embodiment of the present disclosure.

According to the circuit diagram in FIGS. 1, 2 and 3, the second power semiconductor switch 2, for example the bottom IGBT, can never conduct current when Iac (shown in FIGS. 1, 2 and 3) output current is positive.

The IGBT bridge is symmetric, so the same condition can be assumed with a negative current: in this case, the first power semiconductor switch 1, for example top IGBT, can never conduct current when Iac output current is negative.

Referring back to FIG. 5 when the controller removes the opposite power semiconductor switch command during the time when it cannot conduct current (removing the command 4 when the switch 2 does not conduct current), $t_{offMin}$ 11 can now be $t_{offMin}=t_{minpulse}$ which is also shown on FIG. 5.

The dead time and corresponding dead band may not be useful, especially when operating at high duty cycle. A power semiconductor switch 2 which is driven after the dead time will never close. The diode 6 such as the free wheeling diode conducts instead of the power semiconductor switch 2.

Accordingly, the controller is configured to remove the power semiconductor switch command. Additionally the corresponding dead time can be removed each time this power semiconductor switch will not drive current. For example when the controller determines that Iac is positive, the controller removes the bottom command 2. The controller can also remove the corresponding dead time each time power semiconductor switch 2 will not drive current. Example of this state diagram is shown in FIG. 5. The top command 3 drives now power semiconductor switch 1 for the requested PWM 7.

As long as the Iac current remains positive, the off time of the power semiconductor switch 1, for example top IGBT, corresponds to the conduction of the diode 6, for example a free wheeling diode.

The embodiment of FIG. 5 produces a non linearity on the command law. Therefore the transfer function is not continuous. The non linearity is due to a significant difference of actual PWM between the state where the dead band is applied and the state where the dead band is removed.

Figure 6:
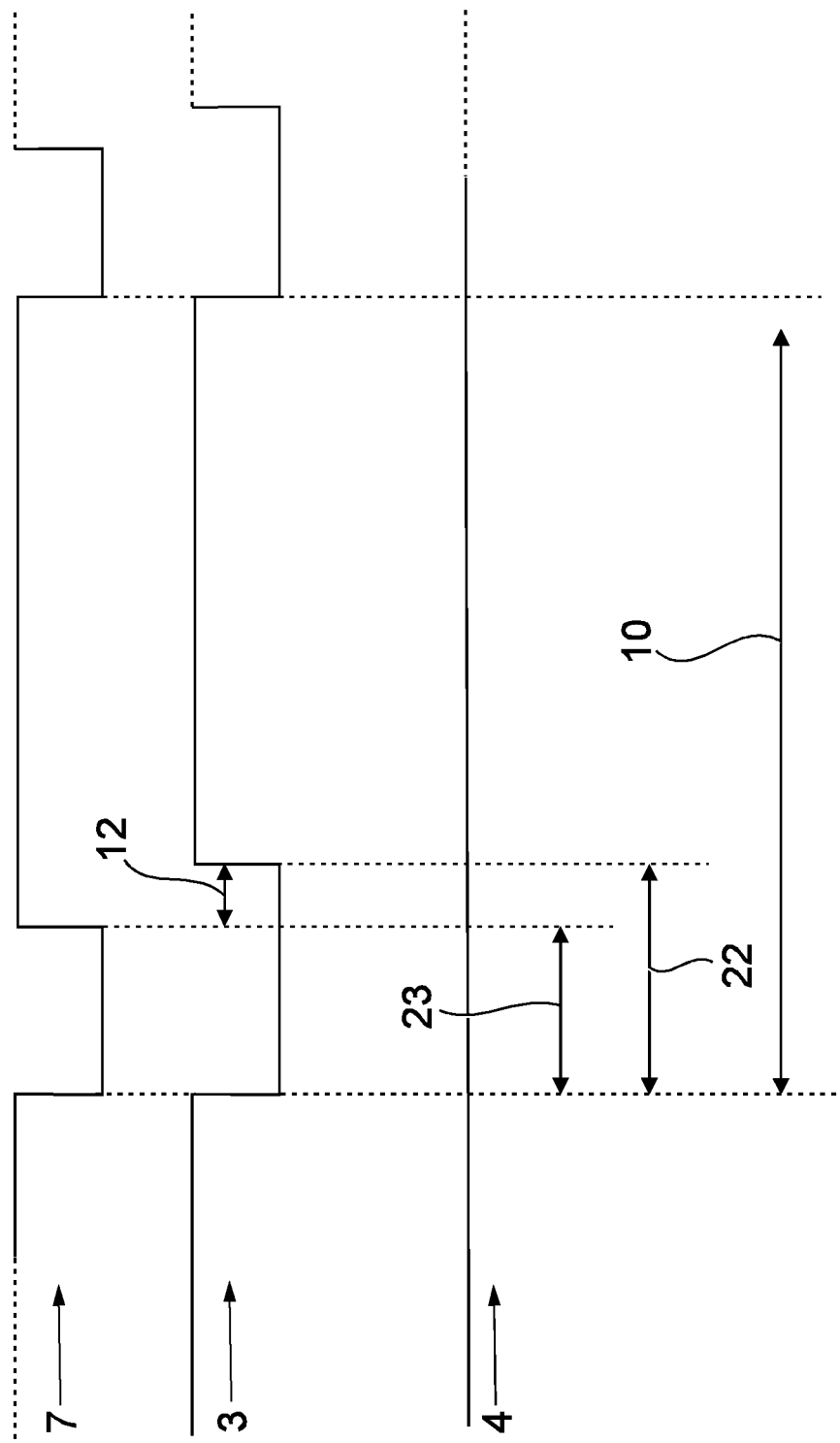
FIG. 6 shows a state diagram of a controller for a power converter, wherein the controller removes a command of a power semiconductor device and variable dead time is applied according to an exemplary embodiment of the present disclosure.

FIG. 6 shows a state diagram of a controller for a power converter, wherein the controller removes a command 4 of a power semiconductor switch 2 and variable dead time 12 is applied according to an exemplary embodiment of the present disclosure. The controller is configured to remove the power semiconductor switch command when it is not useful as described in the embodiment of FIG. 5. In the embodiment of FIG. 6 the controller is configured to modify the switching interval between first power semiconductor device 1 to second power semiconductor device 2, thus modifying the dead time. The dead time is maintained even when it is not useful as described in the embodiment of FIG. 5. The duration of the dead time is reduced as a function of the requested duty cycle of the PWM so as to render the dead time variable dead time 12. The duration of the variable dead time 12 is accordingly reduced in relation to the off state of the requested PWM, $t_{offPWM}$. The reduction of the dead time has an impact on the system performance, which is the case close to the maximum and minimum values.

The controller is configured to modify variable dead time 12. The variable dead time 12 $t_{variabledeadtime}$ is a function 25 (as shown in an embodiment of FIG. 7) of $t_{offPWM}$ (ref. 23 in figures, off time of the requested PWM), so that $t_{variabledeadtime}=f(t_{offPWM})$.

The function 25 uses the parameters (as referred to in the embodiments of FIGS. 4 and 5).

Rated duration of dead time: $t_{deadtime}$. This is the value of the dead time.

The value of the rated duration of the dead time is a constant.

Minimal allowed pulse 9: $t_{minpulse}$
Switching period 10: $T_{switching}$

Figure 7:
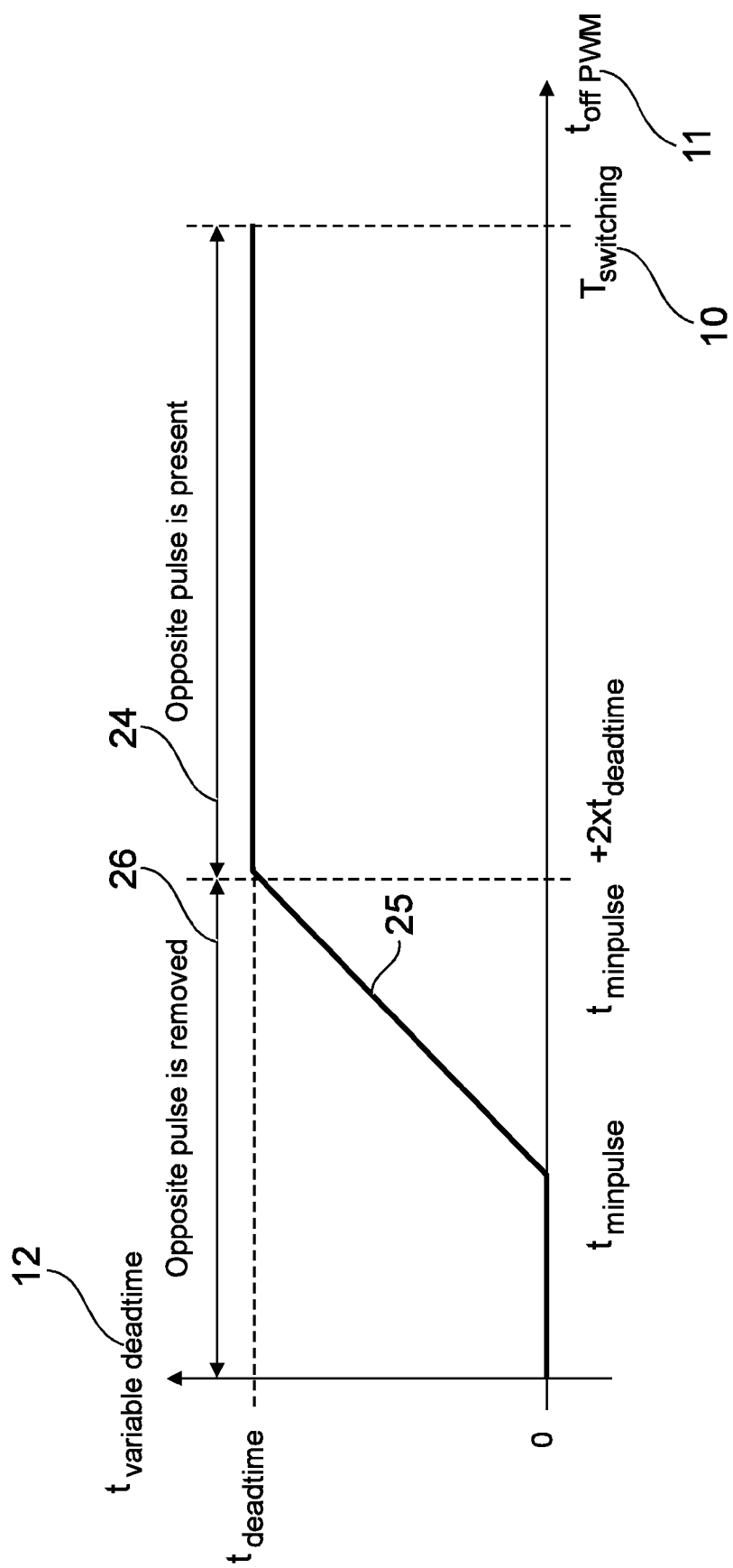
FIG. 7 shows a function of the variable dead time according to an exemplary embodiment of the present disclosure.

In the embodiment of FIGS. 6 and 7, the function 25 can be defined as follows, and is shown in an embodiment of FIG. 7:

In the interval: [0, $t_{minpulse}$] of $t_{offPWM}$, $f(t_{offPWM})$, the function 25, is a constant equal to 0.

In the interval [$t_{minpulse}$, $t_{minpulse}+2\times t_{deadtime}$] of $t_{offPWM}$, $f(t_{offPWM})$ is a linear function as follows:

$$f(t_{offPWM})=0, \text{ when } t_{offPWM}=t_{minpulse}$$

$$f(t_{offPWM})=t_{deadtime} \text{ when } t_{offPWM}=t_{minpulse}+2\times t_{deadtime}$$

In the interval [$t_{minpulse}+2\times t_{deadtime}$, $T_{switching}$] of $t_{offPWM}$, $f(t_{offPWM})$ is a constant equal to $t_{deadtime}$.

Referring to FIG. 6, the real off time 22 applied on the IGBT command is now $t_{offreal}=t_{offPWM}+t_{variabledeadtime}$. This is continuous when $t_{offPWM}$ varies so that the system PWM command law is continuous, and the discontinuity of the embodiments of FIG. 5 can be removed.

If a smoother response is requested, the point where $t_{variabledeadtime}=t_{deadtime}$ can be shifted from $t_{minpulse}+2\times t_{deadtime}$ to higher values in a further embodiment.

In a further embodiment the power semiconductor switch command, for example the opposite pulse, can be removed within interval 26. Within interval 24 the command can be maintained present. The opposite pulse can be removed when variable dead time is used, and the value of the variable dead time is lower than its rated value $t_{deadtime}$.

Embodiment of FIG. 6 provides better gain and better duty cycle. This gain is very important for power converter. The embodiment therefore enables better performance or lower cost. The transfer function is continuous, so there is no risk of instability.

Current Level Controller

The current level controller provides an activation condition of the variable dead time for the controller. The variable dead time should be associated with a removal of the opposite command, which is possible when the current stays in the same direction during the whole switching cycle.

Figure 8:
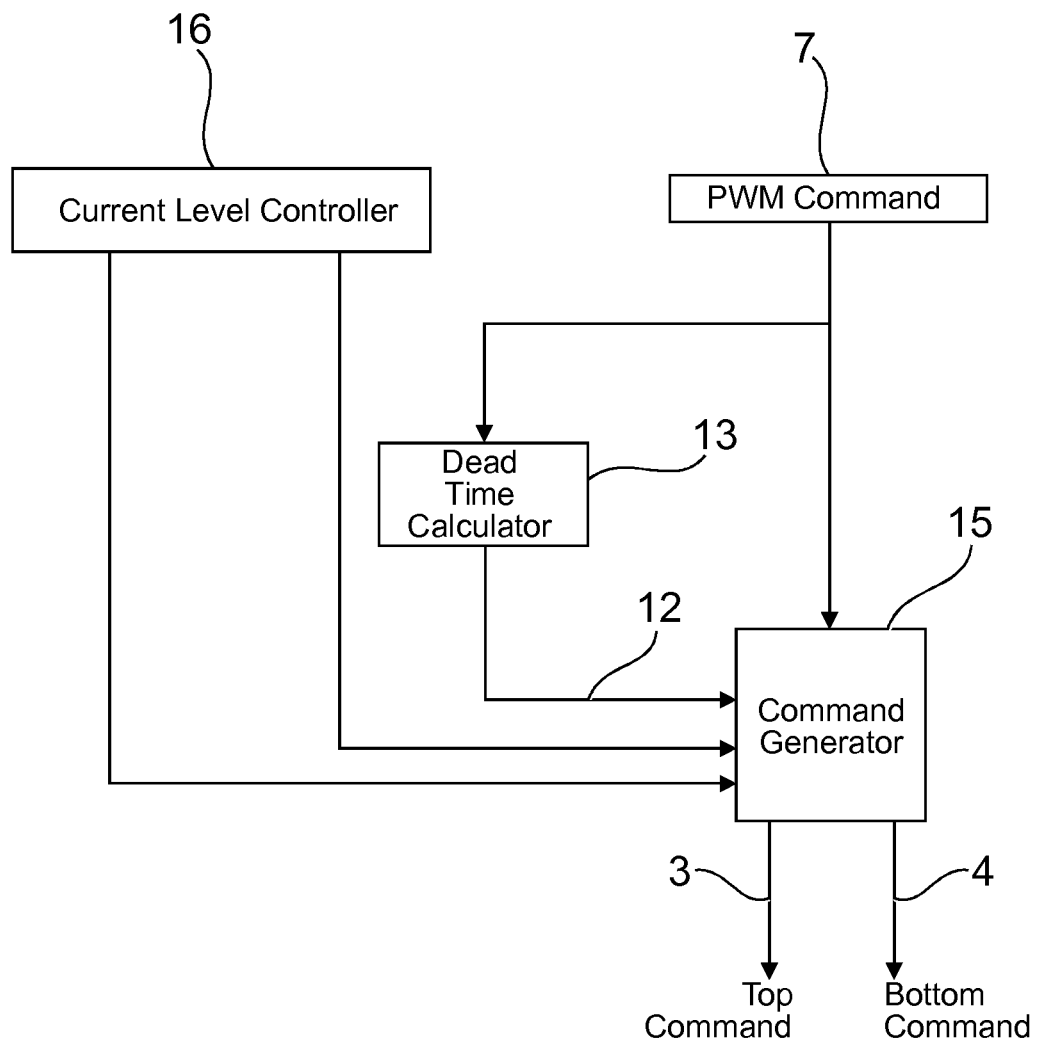
FIG. 8 shows a block diagram of a controller for a power converter according to an exemplary embodiment of the present disclosure.

In a further embodiment, the controller also comprises a current level controller 16 (for example as shown in FIG. 8) to detect whether the output current Iac will remain in the same direction during all of the switching period. The current level controller 16 is configured to check the current level of the output current lac. If the current exceeds a threshold, the detector alerts the controller.

The current level controller 16 determines the current threshold according to the characteristics of the power converter. It corresponds to the worst current variation during the on switching cycle at the full duty cycle.

This current threshold can be optimised in a further embodiment of the present invention at a lower value by re-calculating the next maximal current variation, which can take into account the next duty cycle to be applied to the IGBT and the inductor voltage during the next duty cycle.

The current level controller controls according to the embodiments of FIGS. 5 and 6. The removal of the command is enabled by the current level controller. The variable dead time is enabled by a current level controller. The current level controller is configured so that:

If lac is greater than the removal threshold, the bottom power semiconductor switch command 4 removal is enabled and additionally the variable dead time is enabled, If lac is less than the removal threshold, the top power semiconductor switch command 3 removal is enabled and additionally the variable dead time is enabled.

For example according to the embodiment of FIG. 5 when current is below the removal threshold, the dead time may be applied, and real off state duration of the top power semiconductor switch is $$t_{offReal} = t_{offPWM} + t_{deadtime}$$

When the current exceeds the threshold, dead time is not applied and the controller may remove it. The real off state duration of the top power semiconductor switch is $t_{offReal} = t_{offPWM}$.

FIG. 8 shows a block diagram of a controller for a power converter according to an exemplary embodiment of the present disclosure. The controller comprises at least one logic module or block, which is configured to perform the operations and functions as described in embodiments of FIGS. 1,2,3,4,5 and 6. For example one or more logic blocks are configured to remove the corresponding power semiconductor switch command, and apply a dead time corresponding to the received indication of input dead time duration. The controller comprises a command generator module 15. The command generator 15 comprises one or more of these logic blocks. The command generator module 15 is configured to perform these operations. The command generator 15 receives as its input a PWM command 7, and a variable dead time duration 12, which is determined by a dead time calculator 13. The command generator 15 also receives from the current level controller 16 a signal of the removal allowed for each IGBT driven by the controller as, for example, described previously. The controller of FIG. 8 can be implemented by digital signal processing (DSP), field-programmable gate array (FPGA), or ASIC. The controller may also be implemented by software or hardware so as to run the operations of FIGS. 1 to 7.

The controller can be embedded to the power converter core to replace ordinary command generators. The controller can therefore control an electric power engine, UPS, or the like electric power machine.

Figure 9:
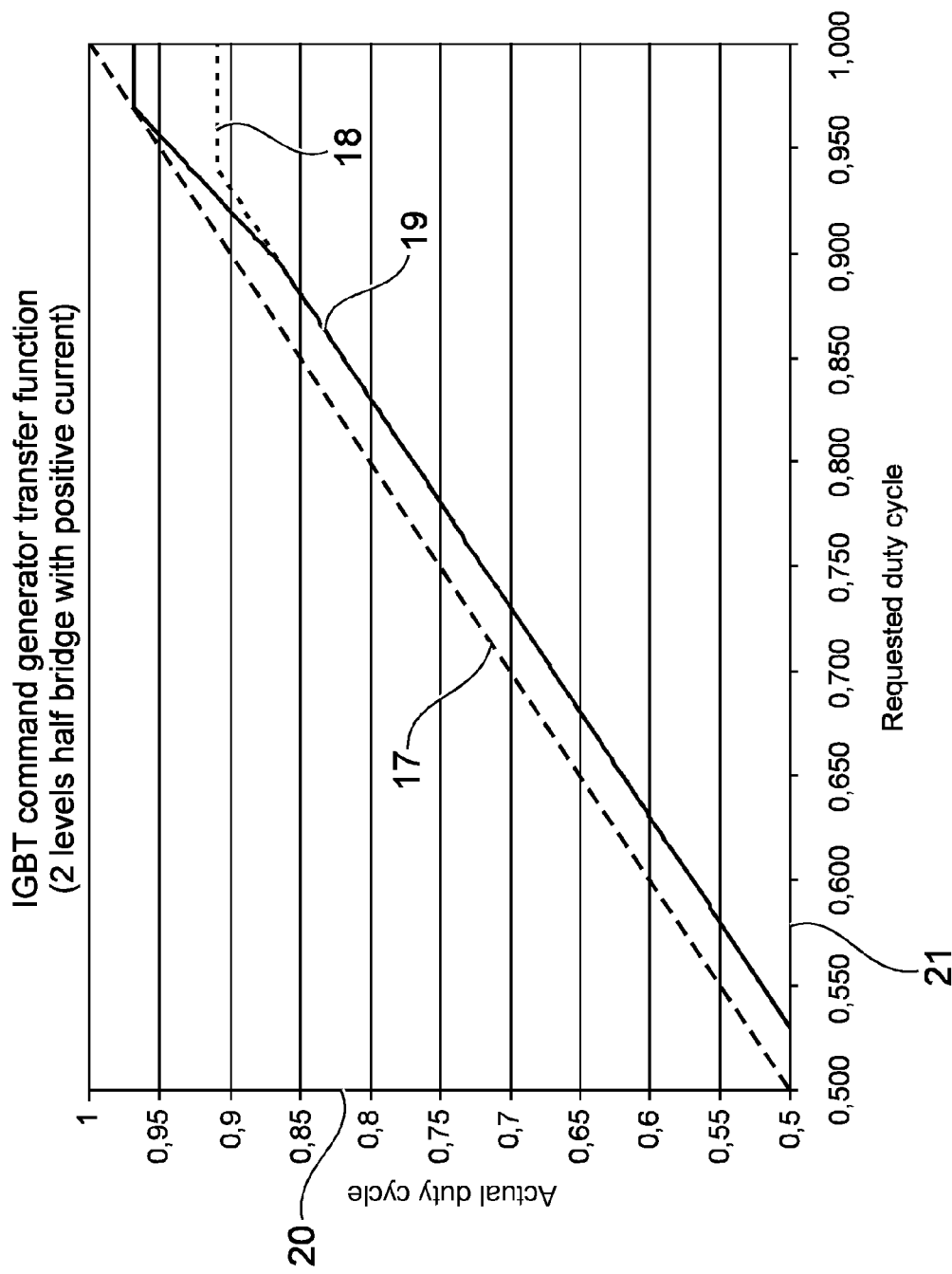
FIG. 9 illustrates a transfer function of the controller according to exemplary embodiments of the present disclosure.

FIG. 9 illustrates a transfer function of the controller according to exemplary embodiments of the present disclosure. FIG. 9 shows actual PWM function of the requested PWM function. Curve 17 illustrates an ideal case having a perfect converter with no dead time and minimal pulse duration. Curve 18 illustrates the operation of the exemplary embodiment of the converter having the standard operation mode without the command removal (when applying both dead time and minimal pulse duration).

Curve 19 illustrates the operation of the exemplary embodiment of the converter having variable dead time in operation. The difference between the curves 18 and 19 corresponds to the effect of the dead band. The clamping of the curves corresponds to the mixed effect of the dead band and minimal pulse duration. X-axis 21 stands for requested duty cycle and Y-axis 20 for actual duty cycle. The advantages of the exemplary embodiments can be higher duty cycle. This gain is beneficial for power converter. Accordingly it is possible to obtain better performance or save costs of the power converter. The exemplary embodiment of the variable dead time provides a continuous transfer function having thereby no risk of instability of regulations.

It will be apparent to those skilled in the art that various modifications and variations can be made to the controller, circuit and method. Other embodiments will be apparent to those skilled in the art from consideration of the specification and practice of the disclosed controller and method. It is intended that the specification and examples be considered as exemplary only, with a true scope being indicated by the following claims and their equivalents.

LIST OF ELEMENTS

Power Converter Controller
1 first power semiconductor device
2 second power semiconductor device
3 top command
4 bottom command
5 current flow
6 diode
7 requested PWM
8 dead time
9 minimal pulse
10 switching period
11 duration when power converter is in off state
12 variable dead time
13 dead time calculator
15 command generator
16 current level controller
17 curve
18 curve
19 curve
20 Y-axis
21 X-axis
22 real off time
23 off time of requested PWM
24 interval
25 function
26 interval

What is claimed is:

1. A controller for a power converter using a pulse width modulation waveform, comprising:
   a current level controller configured to detect a current; and
   at least one control module, the control module configured to cause the controller to
      generate a command for switching a first power semiconductor switch from a conductive state to a non-conductive state;
      maintain the first power semiconductor switch in the non-conductive state for an off-time comprising a time when the pulse width modulation waveform is in an off state;

maintain a second power semiconductor switch in a non-conductive state during the off-time, based upon whether the detected current will remain in a same direction during all of a cycle period of the pulse width modulation waveform, wherein a diode allows an electric current to pass the second power semiconductor switch in one direction, while blocking current in an opposite direction;

generate a delay interval as a variable delay interval before switching of said first power semiconductor switch from the non-conductive state back to a conductive state; and modify a duration of the variable delay interval in relation to the pulse width modulation waveform.

2. The controller according to claim 1, wherein the controller is configured to remove said delay interval.

3. The controller according to claim 1, wherein the controller is configured to modify duration of said variable delay interval in relation to a duty cycle of the pulse width modulation waveform.

4. The controller according to claim 1, wherein the controller is configured to modify duration of said variable delay interval in relation to the time that the pulse width modulation waveform is in the off state.

5. The controller according to claim 1, wherein the controller is configured to modify duration of said variable delay interval in relation to the time that the pulse width modulation waveform is in an on state.

6. The controller according to claim 1, wherein the controller is configured to control said first power semiconductor switch so that the power semiconductor switches generate a pulse width modulation in relation to the command.

7. The controller according to claim 1, wherein the controller is configured to receive the pulse width modulation waveform for controlling said first power semiconductor switch.

8. The controller according to claim 1, wherein said diode is parallel coupled with the second power semiconductor switch.

9. The controller according to claim 1, wherein the current level controller is configured to detect whether the detected current exceeds a threshold and to send the controller an allowance message to maintain the second power semiconductor switch in the non-conductive state.

10. A circuit, comprising the controller according to claim 1, wherein at least one circuit block of said circuit comprises the at least one control module.

11. A controller for a power converter using a pulse width modulation waveform, comprising:

a current level controller configured to detect a current; and at least one control module, the control module configured to cause the controller to generate a command for switching a first power semiconductor switch from a conductive state to a non-conductive state;

maintain the first power semiconductor switch in the non-conductive state for an off-time comprising a time when the pulse width modulation waveform is in an off state;

maintain a second power semiconductor switch in a non-conductive state during the off-time, based upon the detected current, wherein a diode allows an electric current to pass the second power semiconductor switch in one direction, while blocking current in an opposite direction;

generate a delay interval as a variable delay interval before switching of said first power semiconductor switch from the non-conductive state back to a conductive state; and modify a duration of said variable delay interval in relation to a function of said off-time, wherein the function comprises a constant value for the variable delay interval within a first predetermined interval defined by said off-time being lower than a minimum allowed pulse duration.

12. The controller according to claim 11, wherein said function comprises said variable delay interval varying linearly with said off-time within a second predetermined interval defined at a lower end by said minimum allowed pulse duration.

13. The controller according to claim 11, wherein the second power semiconductor switch is maintained in the non-conductive state based upon whether the detected current will remain in a same direction during all of a cycle period of the pulse width modulation waveform.

14. A method for controlling a power converter using pulse width modulation waveform, comprising:

generating a first command for switching a first power semiconductor switch from a conductive state to a non-conductive state;

detecting an output current;

maintaining a second power semiconductor switch in an open state during an off-time when the first power semiconductor switch is in the non-conductive state, based upon whether the output current will remain in a same direction during all of a cycle period of the pulse width modulation waveform;

allowing an electric current to pass the second power semiconductor switch in the open state in one direction, while blocking current in an opposite direction;

generating a delay interval as a variable delay interval before switching of said first power semiconductor switch from the non-conductive state back to a conductive state; and modifying a duration of the delay interval in relation to the pulse width modulation waveform.

15. The method according to claim 14, wherein modifying the duration of the delay interval includes removing the delay interval.

16. The method according to claim 14, wherein modifying the duration of the delay interval includes modifying the duration in relation to a duty cycle of the pulse width modulation waveform.

17. The method according to claim 14, wherein modifying the duration of the delay interval includes modifying the duration in relation to a time that the pulse width modulation waveform is in an off state.

18. The method according to claim 14, wherein modifying the duration of the delay interval includes modifying the duration in relation to a time that the pulse width modulation waveform is in an on state.

19. The method according to claim 14, wherein maintaining the second power semiconductor switch in the open state further includes maintaining the second power semiconductor switch in the open state based upon the output current exceeding a threshold.

* * * * *